Sept. 16, 1958
E. J. GARGINI
2,852,718
CIRCUITS FOR GENERATING UNIDIRECTIONAL VOLTAGES IN TELEVISION RECEIVERS
Filed Aug. 27, 1954
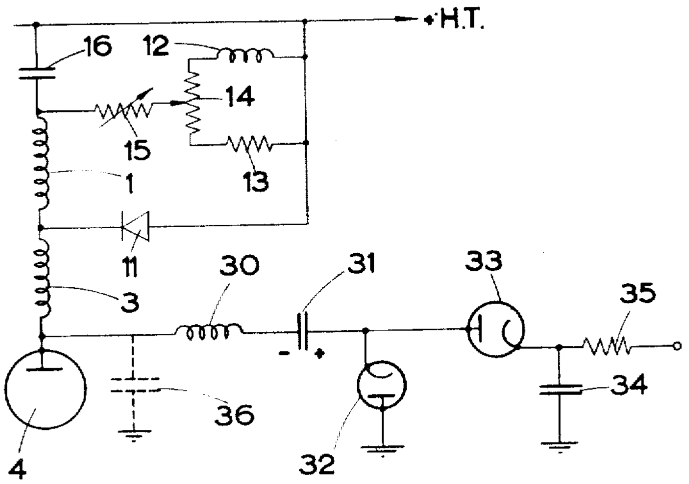
INVENTOR
E. J. Gargini
BY
Stewart Downing Reddell
ATTORNEYS United States Patent Office 2,852,718

Patented Sept. 16, 1958

2,852,718

CIRCUITS FOR GENERATING UNIDIRECTIONAL VOLTAGES IN TELEVISION RECEIVERS

Eric John Gargini, Yiewsley, West Drayton, England, assignor to Electric & Musical Industries Limited, Hayes, Middlesex, England, a British company Application August 27, 1954, Serial No. 452,638

Claims priority, application Great Britain September 3, 1953

2 Claims. (Cl. 315—27)

This invention relates to circuits for generating unidirectional voltages in television receivers and especially to circuits for generating the voltage known as E. H. T.

One form of line scanning circuit which is frequently used in television receivers comprises scanning coils in which sawtooth waveform current is caused to flow. The scanning coils are included in the anode circuit of a control valve, the current in which is periodically interrupted to initiate generation of the return strokes of the waveform. By reason of the inductive nature of the scanning circuit, the interruptions of the currents produce voltage surges of large amplitude at the anode of the valve and in many television receivers these voltage surges are rectified so as to generate the E. H. T. which is required for polarising the second anode of the cathode ray image reproducing tube. Many practical line scanning circuits are of the well known damper valve type and the presence of the damper valve causes each voltage surge to be of asymmetrical character, comprising virtually only one half cycle of oscillation, and it is the rectification of this half cycle of oscillation which produces the E. H. T. However, difficulty may be encountered in generating the large value of E. H. T. which is necessary in modern television receivers.

An object of the present invention is to reduce the difficulty aforesaid.

A further object of the present invention is to provide a line scanning circuit of the damper valve type and associated means for generating a relatively large value of E. H. T. in response to voltage surges in the scanning circuit.

One example of the present invention is illustrated in the single figure of the accompanying drawing.

Referring to the drawing, there is shown a composite line scanning and E. H. T. generating circuit of a television receiver and the circuit comprises line scanning coil 1 connected in the anode lead of a control valve 4 which is only partly shown. The scanning coil is connected at one end via a boost condenser 16 to the positive terminal of the H. T. supply of the receiver, and at the other end to the anode of the valve 4 via an inductor 3. The series combination of the coil 1 and the boost condenser 16 is shunted by a damping rectifier 11, which may be a metal or thermionic diode as required. The boost condenser 15 and diode 11 operate in well known manner and need not be further described. A focus coil for the cathode ray tube of the television receiver is connected in a network across the boost condenser 16, the other components of the network comprising a resistor 13, potentiometer 14 and variable resistor 15, connected as shown. This part of the circuit operates as described in the United States patent specification No. 2,797,358.

The means for generating the E. H. T. for application to the cathode ray tube of the television receiver comprise an inductor 30 (or so-called ringing choke) connected at one end to the anode of the output valve 4 of the line scanning circuit. The other end of the inductor 30 is connected to a capacitor 31, which in turn is connected to the cathode of a rectifier 32 which is shown as a thermionic valve, but may also be a crystal rectifier. The rectifier 32 has its anode grounded and has its cathode connected to the anode of a further rectifier 33. The cathode of the rectifier 33 is in turn grounded through a capacitor 34 and the E. H. T. output is derived from the capacitor 34 via a series smoothing resistor 35. The dotted symbol 36 represents stray capacity appearing between the anode of the valve 4 and ground.

In operation of the arrangement, when valve 4 is cut-off to initiate the short flanks of the sawtooth current waveform produced in the scanning coils 1 a voltage surge is set up at the anode of the valve 4 in known manner, and a ringing circuit including the inductor 30, the stray capacity mainly that across the rectifier 32, 36 and other stray capacity, is shock excited and a damped train of oscillations having a frequency of the order of 60 kilocycles/sec. is initiated in the circuit. These oscillations which assume the form of a damped train of oscillations have initially a greater amplitude at the right hand end of the inductor 30 than the voltage at the anode of the valve 4. When the circuit has been operating for a sufficient time for equilibrium to have been attained, the capacitor 31 is maintained charged, by conduction of the diode 32, approximately to the maximum amplitude of the negative voltage surges which are set up at the right hand end of inductor 30. Similarly, the capacitor 34 is maintained charged, by conduction of the diode 33, approximately to the maximum amplitude of the positive voltage surges set up at the right hand end of the conductor 30, superimposed on the voltage set up across the capacitor 31. The circuit elements 31 to 34 therefore constitute means for peak-rectifying positive and negative half cycles of the oscillations in the ringing circuit including the inductor 30, to produce an output uni-directional voltage across the capacitor 34 substantially greater than the peak amplitude of the oscillation. This voltage is used as the E. H. T., as aforesaid and it may be of the order of twice the peak amplitude of the voltage surges since the initial negative voltage surge may have an amplitude which is only slightly less than that of the initial positive voltage surge.

The first half cycle of the train of oscillations, which consists of a positive voltage surge, corresponds to the return stroke of the sawtooth waveform current in the scanning coils 1. In so far as oscillation continues into the long flanks of this sawtooth waveform, it is arranged that oscillations across the inductor 30 are effective to balance out similar oscillations which would otherwise appear across the scanning coils.

The present invention is not of course confined to scanning circuits of the kind illustrated in which the line scanning coil is connected directly in the anode lead of the control valve. Moreover the invention is not dependent upon the voltage at the anode of the valve 4 exhibiting both positive and negative voltage surges. In some forms of circuits, only the first positive half cycle of oscillation occurs at the anode. However, the inductor 30 in association with the stray capacity 36 and the stray capacity to ground from the right hand end of the conductor constitutes a $\pi$-type circuit which can continue to ring after the oscillation at the anode of the valve 4 has been largely damped which means that the coupling between the inductor 30 and the coil 1 should only be sufficient to produce ring-cancellation in the coils 1 and should not be such as to cause the diode 11 to damp ringing the $\pi$-type circuit too rapidly. Moreover, since in general the stray capacity to ground from the right hand end of the inductor 30 will be less than 36, the ringing oscillations will have greater initial amplitude 30 at the right hand end of 30 than at the anode of the valve.

What I claim is:

1. In a television receiver; a beam deflecting circuit comprising a control valve having an input electrode and an output electrode, an output circuit connected to said output electrode and including a scanning coil and a path including a damper valve connected across said valve, an input circuit connected to said input electrode for applying signals to produce periodic interruptions of the current in said valve to initiate return strokes in said coil, said damper valve damping undesired oscillations in said coil induced by said interruptions; and a uni-directional voltage generator comprising a ringing circuit connected to said output electrode to be excited to oscillation by said current interruptions, and means for additively peak-rectifying positive and negative half cycles of the latter oscillations to produce an output uni-directional voltage, said output circuit also including an impedance connected between said output electrode and said damper valve to reduce damping of said ringing circuit by said damper valve.

2. In a television receiver; a beam deflecting circuit comprising a control valve having an input electrode and an output electrode, an output circuit connected to said output electrode and including the series combination of a scanning coil and an inductor with the inductor nearest said output electrode, and a path including a damper valve connected across said coil, an input circuit connected to said input electrode for applying signals to produce periodic interruption of the current in said valve to initiate return strokes in said coil, said damper valve damping undesired oscillations in said coil induced by said interruptions; and a uni-directional voltage generator comprising an inductor connected at one end to said output electrode to be excited to oscillation by said current interruptions, and means connected to the other end of said latter inductor for additively peak-rectifying positive and negative half cycles of the oscillations across said latter inductor to produce an output uni-directional voltage, said first dimension inductor serving to reduce damping of said latter inductor due to said damper valve.

References Cited in the file of this patent

UNITED STATES PATENTS

| | | |
|---|---|---|
| 2,302,161 | Woerner | Nov. 17, 1942 |
| 2,445,017 | Boadle et al. | July 13, 1948 |
| 2,565,392 | Neuwirth | Aug. 21, 1951 |
| 2,566,432 | Sziklai | Sept. 4, 1951 |
| 2,668,911 | Schlesinger | Feb. 9, 1954 |
| 2,686,276 | Anderson | Aug. 10, 1954 |